United States Patent
Takeuchi et al.

(10) Patent No.: US 10,457,802 B2
(45) Date of Patent: Oct. 29, 2019

(54) CROSSLINKED BODY AND VIBRATION DAMPER

(71) Applicant: MITSUI CHEMICALS, INC., Tokyo (JP)

(72) Inventors: Fumito Takeuchi, Chiba (JP); Kengo Goto, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 178 days.

(21) Appl. No.: 15/555,603

(22) PCT Filed: Mar. 1, 2016

(86) PCT No.: PCT/JP2016/056195
§ 371 (c)(1),
(2) Date: Sep. 5, 2017

(87) PCT Pub. No.: WO2016/143599
PCT Pub. Date: Sep. 15, 2016

(65) Prior Publication Data
US 2019/0211193 A1    Jul. 11, 2019

(30) Foreign Application Priority Data

Mar. 6, 2015 (JP) .................. 2015-044686
Feb. 4, 2016 (JP) .................. 2016-019662

(51) Int. Cl.
| | | |
|---|---|---|
| C08L 23/16 | (2006.01) |
| C08L 23/20 | (2006.01) |
| C08K 3/013 | (2018.01) |
| C08K 3/04 | (2006.01) |
| C08K 3/34 | (2006.01) |
| C08K 3/36 | (2006.01) |
| C08L 91/00 | (2006.01) |

(52) U.S. Cl.
CPC .............. *C08L 23/16* (2013.01); *C08K 3/013* (2018.01); *C08K 3/04* (2013.01); *C08K 3/346* (2013.01); *C08K 3/36* (2013.01); *C08L 23/20* (2013.01); *C08L 91/00* (2013.01); *C08L 2312/00* (2013.01)

(58) Field of Classification Search
CPC .......... C08L 23/16; C08L 23/20; C08L 91/00; C08L 2312/00; C08K 3/013; C08K 3/04; C08K 3/346; C08K 3/36
See application file for complete search history.

(56) References Cited

U.S. PATENT DOCUMENTS

| | | |
|---|---|---|
| 6,316,090 B1 | 11/2001 | Sugimoto et al. |
| 6,410,650 B1 | 6/2002 | Koda et al. |
| 6,429,264 B2 | 8/2002 | Sugimoto et al. |
| 6,723,794 B2 | 4/2004 | Kawasaki et al. |
| 7,166,678 B2 | 1/2007 | Dunlap et al. |
| 2003/0096912 A1 | 5/2003 | Kawasaki et al. |
| 2005/0221039 A1 | 10/2005 | Dunlap et al. |
| 2007/0249792 A1 | 10/2007 | Kawahara et al. |
| 2009/0239014 A1 | 9/2009 | Noguchi et al. |
| 2010/0068452 A1 | 3/2010 | Kusanose et al. |
| 2012/0220728 A1* | 8/2012 | Uekusa et al. ........ C08F 210/00 525/240 |
| 2014/0088214 A1 | 3/2014 | Okamoto et al. |

FOREIGN PATENT DOCUMENTS

| | | |
|---|---|---|
| CN | 1140728 A | 1/1997 |
| CN | 1310730 A | 8/2001 |
| CN | 1557869 A | 12/2004 |
| CN | 1957191 A | 5/2007 |
| DE | 19757398 A1 | 6/1998 |
| JP | 11-080452 | 3/1999 |
| JP | 2002-179927 | 6/2002 |
| JP | 2007-023258 | 2/2007 |

(Continued)

OTHER PUBLICATIONS

Japanese Office Action dated Jul. 30, 2018 in corresponding application No. 2017-504994.
International Search Report issued in International Patent Application No. PCT/JP2016/056195 dated May 17, 2016.
XP002784929—Database WPI, Week 201405, Thomson Scientific, London, GB; AN2013-X44856.
XP002784932—Database WPI, Week 200722, Thomson Scientific, London, GB; AN2007-213755.
XP002784931—Database WPI, Week 201231, Thomson Scientific, London, GB; AN2012-E72985.
Extended European Search Report dated Oct. 1, 2018 in corresponding application No. 16761569.9.

(Continued)

*Primary Examiner* — Nathan M Nutter
(74) *Attorney, Agent, or Firm* — Foley & Lardner LLP

(57) ABSTRACT

The present invention is a crosslinked body obtained by crosslinking a composition which comprises 100 parts by mass of (A) an ethylene/α-olefin/non-conjugated polyene copolymer having one or more peaks of tan δ in the temperature range of −50 to −30° C., the tan δ being determined by dynamic viscoelasticity measurement, 50 to 500 parts by mass of (B) an olefin-based copolymer having one or more peaks of tan δ in the temperature range of 0 to 40° C., the tan δ being determined by dynamic viscoelasticity measurement, 5 to 300 parts by mass of (C) a softener, 10 to 300 parts by mass of (D) a reinforcing filler and 0.1 to 10 parts by mass of (E) a vulcanizing agent, and which has a content ratio by mass ((C)/(D)) of (C) the softener to (D) the reinforcing filler of 0.3 to 1.5, the crosslinked body having a durometer hardness (value immediately after measurement) of 50 to 8. The crosslinked body of the present invention has high hardness and low rebound resilience compatible with each other, and from the crosslinked body, a vibration damper having high hardness and low rebound resilience compatible with each other and various products requiring vibration damping properties can be obtained.

18 Claims, No Drawings

(56) References Cited

FOREIGN PATENT DOCUMENTS

| JP | 2011-001489 A | 1/2011 |
| JP | 2012082388 A | 4/2012 |
| JP | 2012-097249 | 5/2012 |
| JP | 5424893 | 2/2014 |
| JP | 2014-210869 | 11/2014 |
| TW | 201404811 A | 2/2014 |
| WO | WO-2005-121192 | 12/2005 |
| WO | WO-2008-102761 | 8/2008 |
| WO | WO-2012-157709 | 11/2012 |
| WO | WO-2013-191222 A1 | 12/2013 |

OTHER PUBLICATIONS

Japanese Office Action dated Jul. 2018 in corresponding application No. 2017-504994. Japanese Office Action dated Jul. 31, 2018 in corresponding application No. 2017-504994.
Chinese Office Action dated Mar. 12, 2019 in corresponding application No. 201680010734.5.

* cited by examiner

CROSSLINKED BODY AND VIBRATION DAMPER

RELATED APPLICATIONS

The present application claims priority under 35 USC 371 to International Patent Application number PCT/JP2016/056195, filed Mar. 1, 2016, which claims priority to Japanese Patent Application No. JP2016-019662, filed Feb. 4, 2016 and Japanese Patent Application No. JP2015-044686, filed Mar. 6, 2015. The contents of these applications are hereby incorporated by reference in their entireties.

TECHNICAL FIELD

The present invention relates to a crosslinked body and a vibration damper, and more particularly to a crosslinked body and a vibration damper both of which have high hardness and low rebound resilience compatible with each other.

BACKGROUND ART

In parts and housings of building materials, electrical and electronic appliances (e.g., personal computers, office automation equipment, audiovisual equipment and cellular phones), optical instruments, precision instruments, toys, household/office electric appliances and the like, particularly in parts and molded materials that are utilized in the fields of transit and transportation industries, such as railway vehicles, automobiles, ships and airplanes, vibration damping properties are demanded in addition to general material properties, such as impact resistance, heat resistance, strength and dimensional stability. Therefore, vibration dampers are used for such parts and molded materials.

The vibration dampers include low-hardness products having gel-like properties, which are used for soles of athletic shoes, etc., and high-hardness products having relatively high hardness, which are used for support materials of audio equipment, etc.

In the case of the low-hardness products, various low-rebound resilience materials are produced by processing them into gels or sponges, and they are widely used. Also in the case of the high-hardness products, low rebound resilience is demanded. In the conventional high-hardness products, however, if high hardness is maintained, low rebound resilience is not obtained, and if low rebound resilience is promoted, high hardness is impaired, so that there is a problem of difficulty in making high hardness and low rebound resilience compatible with each other.

As a high-hardness vibration damper, a vibration damper comprising an olefin-based polymer constituted of 50 to 100% by weight of structural units derived from 4-methyl-1-pentene and 0 to 50% by weight of structural units derived from at least one olefin selected from olefins having 2 to 20 carbon atoms, except 4-methyl-1-pentene, is disclosed in, for example, a patent literature 1.

In a patent literature 2, a low-rebound resilience/vibration damping polymer composition in which into a copolymer such as polyurethane an active component to increase the amount of dipole moment of the copolymer has been compounded is disclosed.

In a patent literature 3, a shock absorber composition comprising a copolymer containing a vinyl aromatic compound, wherein a tan δ peak obtained by dynamic viscoelasticity measurement (1 Hz) of the copolymer is in the range of higher than 0° C. but not higher than 20° C., a tan δ value is not less than 0.4 in the total temperature range of 5° C. to 15° C., and a tan δ value at 15° C. is not less than 0.5, is disclosed.

In a patent literature 4, a rubber composition having at least one peak of loss tangent (tan δ) in the range of −60 to −30° C., the loss tangent being measured at 100 rad/sec, and at least one peak thereof in the range of 0 to 40° C., wherein the rubber composition comprises an acrylic copolymer in which an α,β-unsaturated nitrile monomer has been copolymerized, and an ethylene/α-olefin-based copolymer having a peak of the above tan δ in the range of −60 to −30° C., is disclosed.

In any of the above techniques, however, compatibility of high hardness and low rebound resilience with each other, particularly compatibility of high hardness such as a durometer hardness of 50 to 80 and low rebound resilience such as a rebound resilience of not more than 20% with each other has not been sufficiently realized.

CITATION LIST

Patent Literature

Patent literature 1: Re-publication of PCT International Publication No. 2005/121192

Patent literature 2: Japanese Patent Laid-Open Publication No. 2002-179927

Patent literature 3: Re-publication of PCT International Publication No. 2008/102761

Patent literature 4: Japanese Patent Laid-Open Publication No. 2007-023258

SUMMARY OF INVENTION

Technical Problem

The present inventor has made a study in order to obtain a material having high hardness and low rebound resilience compatible with each other. Specifically, a method of using a combination of well-known vibration damping materials including the above-described materials has been studied. However, it has been found that even if these materials are only used in combination, making high hardness such as a durometer hardness of 50 to 80 and low rebound resilience such as a rebound resilience of not more than 20% compatible with each other cannot be achieved.

It is an object of the present invention to provide a novel vibration damper having high hardness and low rebound resilience that are compatible with each other, particularly high hardness such as a durometer hardness of 50 to 80 and low rebound resilience such as a rebound resilience of not more than 20% that are compatible with each other, and a production process for the vibration damper.

Solution to Problem

The present inventor has found that a composition containing specific components and a crosslinked body obtained by crosslinking the composition have high hardness and low rebound resilience compatible with each other and from this crosslinked body a vibration damper having high hardness and low rebound resilience compatible with each other can be obtained. Thus, the present invention has been completed.

That is to say, the present invention relates to the following [1] to [12].

[1] A composition comprising 100 parts by mass of (A) an ethylene/α-olefin/non-conjugated polyene copolymer having one or more peaks of tan δ in the temperature range of −50 to −30° C., the tan δ being determined by dynamic viscoelasticity measurement, 50 to 500 parts by mass of (B) an olefin-based copolymer having one or more peaks of tan δ in the temperature range of 0 to 40° C., the tan δ being determined by dynamic viscoelasticity measurement, 5 to 300 parts by mass of (C) a softener, 10 to 300 parts by mass of (D) a reinforcing filler, and 0.1 to 10 parts by mass of (E) a vulcanizing agent, the composition having a compounding ratio by mass ((C)/(D)) of (C) the softener to (D) the reinforcing filler of 0.3 to 1.5.

[2] A crosslinked body obtained by crosslinking a composition comprising 100 parts by mass of (A) an ethylene/α-olefin/non-conjugated polyene copolymer having one or more peaks of tan δ in the temperature range of −50 to −30° C., the tan δ being determined by dynamic viscoelasticity measurement, 50 to 500 parts by mass of (B) an olefin-based copolymer having one or more peaks of tan δ in the temperature range of 0 to 40° C., the tan δ being determined by dynamic viscoelasticity measurement, 5 to 300 parts by mass of (C) a softener, 10 to 300 parts by mass of (D) a reinforcing filler, and 0.1 to 10 parts by mass of (E) a vulcanizing agent, the composition having a compounding ratio by mass ((C)/(D)) of (C) the softener to (D) the reinforcing filler of 0.3 to 1.5, the crosslinked body having a durometer hardness (value immediately after measurement) of 50 to 80.

[3] The crosslinked body according to [2], wherein a temperature profile of tan δ obtained by measuring temperature dependence of dynamic viscoelasticity under the conditions of 1 Hz, 0.5%, −70 to 100° C. and a temperature rise rate of 4° C./min shows bimodality, and peaks of the tan δ satisfy the following requirements:

(1) a peak on the low temperature side is present in the temperature range of not lower than −50° C. but lower than −10° C., and (2) a peak on the high temperature side is present in the temperature range of −10 to 40° C.

[4] The crosslinked body according to [3], wherein peaks of the tan δ further satisfy the following requirement (3):

(3) [value of tan δ at the peak present in the temperature range of −10 to 40° C.]≥[value of tan δ at the peak present in the temperature range of not lower than −50° C. but lower than −10° C.]

[5] The crosslinked body according to any one of [2] to [4], wherein (B) the olefin-based copolymer comprises (B1) a 4-methyl-1-pentene/α-olefin copolymer having a content ratio of structural units (i) of 16 to 95% by mol, the structural units (i) being derived from 4-methyl-1-pentene, a content ratio of structural units (ii) of 5 to 84% by mol, the structural units (ii) being derived format least one α-olefin selected from α-olefins having 2 to 20 carbon atoms (except 4-methyl-1-pentene), and a content ratio of structural units (iii) of 0 to 10% by mol, the structural units (iii) being derived from a non-conjugated polyene, (with the proviso that the total of the structural units (i), (ii) and (iii) is 100% by mol).

[6] The crosslinked body according to any one of [2] to [5], wherein (D) the reinforcing filler is at least one kind selected from carbon black, mica, talc, silica and clay.

[7] The crosslinked body according to any one of [2] to [6], wherein (C) the softener is paraffin oil.

[8] A vibration damping member obtained by using the crosslinked body according to any one of [2] to [7].

[9] A shock absorber obtained by using the crosslinked body according to any one of [2] to [7].

[10] A vibration absorber obtained by using the crosslinked body according to any one of [2] to [7].

[11] A resonance suppressor obtained by using the crosslinked body according to any one of [2] to [7].

[12] A production process for an olefin polymer crosslinked body, comprising allowing a composition comprising 100 parts by mass of (A) an ethylene/α-olefin/non-conjugated polyene copolymer having one or more peaks of tan δ in the temperature range of −50 to −30° C., the tan δ being determined by dynamic viscoelasticity measurement, 50 to 500 parts by mass of (B) an olefin-based copolymer having one or more peaks of tan δ in the temperature range of 0 to 40° C., the tan δ being determined by dynamic viscoelasticity measurement, 5 to 300 parts by mass of (C) a softener, 10 to 300 parts by mass of (D) a reinforcing filler, and 0.1 to 10 parts by mass of (E) a vulcanizing agent, to react under the conditions of 140 to 230° C., the composition having a compounding ratio by mass ((C)/(D)) of (C) the softener to (D) the reinforcing filler of 0.3 to 1.5.

Advantageous Effects of Invention

In the crosslinked body of the present invention, compatibility of high hardness and low rebound resilience with each other, particularly compatibility of high hardness such as a durometer hardness of 50 to 80 and low rebound resilience such as a rebound resilience of not more than 20% with each other has been realized, and from this crosslinked body, a vibration damper having high hardness and low rebound resilience compatible with each other, and in addition, various products requiring vibration damping properties are obtained. Since the crosslinked body of the present invention contains an olefin-based rubber, weathering resistance, moist heat resistance and weight reduction can be expected.

DESCRIPTION OF EMBODIMENTS

The crosslinked body of the present invention is obtained by crosslinking a composition comprising 100 parts by mass of (A) an ethylene/α-olefin/non-conjugated polyene copolymer having one or more peaks of tan δ in the temperature range of −50 to −30° C., the tan δ being determined by dynamic viscoelasticity measurement, 50 to 500 parts by mass of (B) an olefin-based copolymer having one or more peaks of tan δ in the temperature range of 0 to 40° C., the tan δ being determined by dynamic viscoelasticity measurement, 5 to 300 parts by mass of (C) a softener, 10 to 300 parts by mass of (D) a reinforcing filler, and 0.1 to 10 parts by mass of (E) a vulcanizing agent, the composition having a compounding ratio by mass ((C)/(D)) of (C) the softener to (D) the reinforcing filler of 0.3 to 1.5, and the crosslinked body has a durometer hardness (value immediately after measurement) of 50 to 80.

First, the composition is described.

<Composition>

The composition comprises (A) the ethylene/α-olefin/non-conjugated polyene copolymer, (B) the olefin-based copolymer, (C) the softener, (D) the reinforcing filler and (E) the vulcanizing agent.

(A) Ethylene/α-Olefin/Non-Conjugated Polyene Copolymer

First, tan δ determined by dynamic viscoelasticity measurement is described. While continuously changing the ambient temperature, a material is subjected to dynamic viscoelasticity measurement to measure a storage elastic modulus G' (Pa) and a loss elastic modulus G" (Pa), and a loss tangent tan δ given by G"/G' is determined. When a relationship between the temperature and the loss tangent tan δ is observed, the loss tangent tan δ generally has a peak at a specific temperature. The temperature at which the peak appears is generally called a glass transition temperature (also referred to as "tan δ-Tg" hereinafter). The temperature at which the peak of the loss tangent tan δ appears can be determined based on the dynamic viscoelasticity measurement described in Examples.

(A) The ethylene/α-olefin/non-conjugated polyene copolymer (also referred to as a "copolymer (A)" hereinafter) has one or more peaks of the tan δ in the temperature range of −50 to −30° C.

From the viewpoint of improvement in high hardness and low rebound resilience of across linked body obtained from the composition, the copolymer (A) has a peak of tan δ preferably in the temperature range of −46 to −33° C., more preferably in the temperature range of −44 to −35° C.

The α-olefin in (A) the ethylene/α-olefin/non-conjugated polyene copolymer is, for example, an α-olefin having 3 to 20 carbon atoms. Specific examples of the α-olefins include propylene, butene-1, 4-methyl-penetene-1, hexene-1, heptene-1, octene-1, nonene-1, decene-1, undecene-1, dodecene-1, tridecene-1, tetradecene-1, pentadecene-1, hexadecene-1, heptadecene-1, nonadecene-1, eicosene-1, 9-methyl-decene-1, 11-methyl-dodecene-1 and 12-ethyl-tetradecene-1. These α-olefins can be used singly or in combination of two or more kinds.

The non-conjugated polyene in (A) the ethylene/α-olefin/non-conjugated polyene copolymer is, for example, a non-conjugated polyene having 5 to 20 carbon atoms, preferably 5 to 10 carbon atoms, and specific examples thereof include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene, dicyclopentadiene, cyclohexadiene, dicyclooctadiene, methylenenorbornene, 5-vinylnorbornene, 5-ethylidene-2-norbornene, 5-methylene-2-norbornene, 5-vinylidene-2-norbornene, 5-isopropylidene-2-norbonrnene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

In (A) the ethylene/α-olefin/non-conjugated polyene copolymer, from the viewpoint of flexibility, the content of structural units derived from ethylene is preferably 40 to 72% by mass, more preferably 41 to 70% by mass, still more preferably 42 to 65% by mass, and the content of structural units derived from the non-conjugated polyene is preferably 2 to 15% by mass, more preferably 3 to 14% by mass, still more preferably 4 to 12% by mass.

In (A) the ethylene/α-olefin/non-conjugated polyene copolymer, the α-olefin is preferably an α-olefin having 3 to 10 carbon atoms among the aforesaid α-olefins, and is particularly preferably propylene, 1-butene, 1-hexene, 1-octene or the like.

In (A) the ethylene/α-olefin/non-conjugated polyene copolymer, the non-conjugated polyene is preferably dicyclopentadiene, 5-vinylidene-2-norbornene, 5-ethylidene-2-norbornene or the like among the aforesaid non-conjugated polyenes.

(B) Olefin-Based Copolymer (B) The olefin-based copolymer (also referred to as a "copolymer (B)" hereinafter) has one or more peaks of the tan δ in the temperature range of 0 to 40° C. By using the copolymer (A) and the copolymer (B) in combination, high hardness and low rebound resilience of a crosslinked body obtained from the composition can be made compatible with each other. Further, since a crosslinked body obtained from the composition contains the copolymer (B) that is an olefin-based rubber, enhancement in weathering resistance, moist heat resistance and weight reduction can be expected.

From the viewpoint of improvement in high hardness and low rebound resilience of a crosslinked body obtained from the composition, the copolymer (B) has a peak of tan δ preferably in the temperature range of 4 to 36° C., more preferably in the temperature range of 7 to 33° C.

From the viewpoint of enhancement in vibration damping properties of a crosslinked body obtained from the composition, the composition contains the copolymer (B) in an amount of 50 to 500 parts by mass, preferably 100 to 400 parts by mass, based on 100 parts by mass of the copolymer (A).

From the viewpoints of weathering resistance and ozone resistance, the copolymer (B) preferably contains a 4-methyl-1-pentene/α-olefin copolymer.

The α-olefin in the 4-methyl-1-pentene/α-olefin copolymer is, for example, an α-olefin having 2 to 20 carbon atoms, and specific examples thereof include straight-chain or branched α-olefins except 4-methyl-1-pentene, cyclic olefins, aromatic vinyl compounds, conjugated dienes, functionalized vinyl compounds, hydroxyl group-containing olefins and halogenated olefins.

The straight-chain α-olefins are, for example, those having 2 to 20 carbon atoms, preferably 2 to 15 carbon atoms, more preferably 2 to 10 carbon atoms, and specific examples thereof include ethylene, propylene, 1-butene, 1-pentene, 1-hexene, 1-octene, 1-decene, 1-undecene, 1-dodecene, 1-tetradecene, 1-hexadecene, 1-octadecene and 1-eicosene. Of these, preferable are ethylene, propylene, 1-butene, 1-pentene, 1-hexene and 1-octene.

The branched α-olefins are, for example, those preferably having 5 to 20 carbon atoms, more preferably 5 to 15 carbon atoms, and specific examples thereof include 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene and 3-ethyl-1-hexene.

The cyclic olefins are, for example, those having 3 to 20 carbon atoms, preferably 5 to 15 carbon atoms, and specific examples thereof include cyclopentene, cyclohexene, cycloheptene, norbornene, 5-methyl-2-norbornene, tetracyclododecene and vinylcyclohexane.

Examples of the aromatic vinyl compounds include styrene, and mono- or poly-alkylstyrenes, such as α-methylstyrene, o-methylstyrene, m-methylstyrene, p-methylstyrene, o,p-dimethylstyrene, o-ethylstyrene, m-ethylstyrene and p-ethylstyrene.

The conjugated dienes are, for example, those having 4 to 20 carbon atoms, preferably 4 to 10 carbon atoms, and specific examples thereof include 1,3-butadiene, isoprene, chloroprene, 1,3-pentadiene, 2,3-dimethylbutadiene, 4-methyl-1,3-pentadiene, 1,3-hexadiene and 1,3-octadiene.

Examples of the functionalized vinyl compounds include hydroxyl group-containing olefins; halogenated olefins; unsaturated carboxylic acids, such as (meth)acrylic acid, propionic acid, 3-butenoic acid, 4-pentenoic acid, 5-hexenoic acid, 6-heptenoic acid, 7-octenoic acid, 8-nonenoic acid, 9-decenoic acid and 10-undecenoic acid; unsaturated amines, such as allylamine, 5-hexaneamine and 6-hepteneamine; (2,7-octadienyl) succinic anhydride, pentapropenyl succinic anhydride; unsaturated carboxylic anhydrides, such as anhydrides obtained from the above-described unsaturated carboxylic acids; unsaturated carboxylic halides, such as halides obtained from the above-described unsaturated carboxylic acids; unsaturated epoxy compounds, such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene and 11-epoxy-1-undecene; and ethylenically unsaturated silane compounds, such as vinyltriethoxysilane, vinyltrimethoxysilane, 3-acryloxypropyltrimethoxysilane, γ-glycidoxypropyltriptylt-rimethoxysilane, γ-aminopropyltriethoxysilane and γ-methacryloxypropyltrimethoxysilane.

The hydroxyl group-containing olefins are not specifically restricted as long as they are hydroxyl group-containing olefin-based compounds, and examples thereof include hydroxyl group-terminated olefin-based compounds. Specific examples of the hydroxyl group-terminated olefin-based compounds include straight-chain hydroxylated α-olefins having 2 to 20 carbon atoms, preferably 2 to 15 carbon atoms, such as vinyl alcohol, ally alcohol, hydroxylated 1-butene, hydroxylated 1-pentene, hydroxylated 1-hexene, hydroxylated 1-octene, hydroxylated 1-decene, hydroxylated 1-undecene, hydroxylated 1-dodecene, hydroxylated 1-tetradecene, hydroxylated 1-hexadecene, hydroxylated 1-octadecene and hydroxylated 1-eicosene; and branched hydroxylated α-olefins preferably having 5 to 20 carbon atoms, more preferably 5 to 15 carbon atoms, such as hydroxylated 3-methyl-1-butene, hydroxylated 3-methyl-1-pentene, hydroxylated 4-methyl-1-pentene, hydroxylated 3-ethyl-1-pentene, hydroxylated 4,4-dimethyl-1-pentene, hydroxylated 4-methyl-1-hexene, hydroxylated 4,4-dimethyl-1-hexene, hydroxylated 4-ethyl-1-hexene and hydroxylated 3-ethyl-1-hexene.

The halogenated olefins are, for example, halogenated α-olefins having an atom belonging to Group 17 of the periodic table, such as chlorine, bromine or iodine, and specific examples thereof include straight-chain halogenated α-olefins having 2 to 20 carbon atoms, preferably 2 to 15 carbon atoms, such as halogenated vinyl, halogenated 1-butene, halogenated 1-pentene, halogenated 1-hexene, halogenated 1-octene, halogenated 1-decene, halogenated 1-dodecene, halogenated 1-undecene, halogenated 1-tetradecene, halogenated 1-hexadecene, halogenated 1-octadecene and halogenated 1-eicosene; and branched halogenated α-olefins preferably having 5 to 20 carbon atoms, more preferably 5 to 15 carbon atoms, such as halogenated 3-methyl-1l-butene, halogenated 4-methyl-1-pentene, halogenated 3-methyl-1-pentene, halogenated 3-ethyl-1-pentene, halogenated 4,4-dimethyl-1-pentene, halogenated 4-methyl-1-hexene, halogenated 4,4-dimethyl-1-hexene, halogenated 4-ethyl-1-hexene and halogenated 3-ethyl-1-hexene.

In the 4-methyl-1-pentene/α-olefin copolymer, the above-described α-olefins may be used singly, or may be used in combination of two or more kinds.

The α-olefin in the 4-methyl-1-pentene/α-olefin copolymer is particularly preferably ethylene, propylene, 1-butene, 1-pentene, 1-hexene, 3-methyl-1-butene, 3-methyl-1-pentene, 1-octene, 1-decene, 1-undecene, 1-dodecene, 1-tetradecene, 1-hexadecene, 1-octadecene, 1-eicosene, norbornene, 5-methyl-2-norbornene, tetracyclododecene or hydroxylated 1-undecene. Further, from the viewpoints of flexibility, stress absorption properties, stress relaxation properties and the like, straight-chain α-olefins having 2 to 10 carbon atoms are preferable, and ethylene, propylene, 1-butene, 1-pentene, 1-hexene and 1-octene are more preferable. Of these, ethylene and propylene are preferable, and propylene is particularly preferable, from the viewpoint of obtaining high stress absorption properties and polyolefin-modifying properties.

The 4-methyl-1-pentene/α-olefin copolymer may contain structural units derived from a non-conjugated polyene, when needed. The non-conjugated polyene is the same as the non-conjugated polyene in the aforesaid ethylene/α-olefin/non-conjugated polyene copolymer (A).

The 4-methyl-1-pentene/α-olefin copolymer may contain other copolymerized components within limits not detrimental to the object of the present invention.

The 4-methyl-1-pentene/α-olefin copolymer is preferably a 4-methyl-1-pentene/α-olefin copolymer containing structural units (i) derived from 4-methyl-1-pentene and structural units (ii) derived from at least one α-olefin selected from α-olefins having 2 to 20 carbon atoms, except 4-methyl-1-pentene, and optionally containing structural units (iii) derived from a non-conjugated polyene. With regard to the content ratios of the structural units (i), the structural units (ii) and the structural units (iii), it is preferable that the content ratio of the structural units (i) is 16 to 95% by mol, the content ratio of the structural units (ii) is 5 to 84% by mol, and the content ratio of the structural units (iii) is 0 to 10% by mol, it is more preferable that the content ratio of the structural units (i) is 26 to 90% by mol, the content ratio of the structural units (ii) is 10 to 74% by mol, and the content ratio of the structural units (iii) is 0 to 7% by mol, and it is still more preferable that the content ratio of the structural units (i) is 61 to 85% by mol, the content ratio of the structural units (ii) is 15 to 39% by mol, and the content ratio of the structural units (iii) is 0 to 5% by mol, with the proviso that the total of the structural units (i), (ii) and (iii) is 100% by mol.

As described above, the copolymer (B) preferably contains (B1) the 4-methyl-1-pentene/α-olefin copolymer in which the content ratio of the structural units (i) is 16 to 95% by mol, the content ratio of the structural units (ii) is 5 to 84% by mol, and the content ratio of the structural units (iii) is 0 to 10% by mol (with the proviso that the total of the structural units (i), (ii) and (iii) is 100% by mol).

(C) Softener

Examples of (C) the softeners include petroleum-based softeners, e.g., process oils such as paraffin oils (e.g., "DIANA PROCESS OIL PS-430" (trade name, manufactured by Idemitsu Kosan Co., Ltd.)), lubricating oils, liquid paraffin, petroleum asphalt and Vaseline; coal tar-based softeners, such as coal tar and coal tar pitch; fatty oil-based softeners, such as castor oil, linseed oil, rapeseed oil, soybean oil and coconut oil; waxes, such as beeswax, carnauba wax and lanolin; fatty acids and salts thereof, such as ricinoleic acid, palmitic acid, stearic acid, barium stearate, calcium stearate and zinc laurate; naphthenic acid, pine oil, and rosin or its derivatives; synthetic polymer materials, such as terpene resin, petroleum resin, atactic polypropylene and cumarone-indene resin; eater-based softeners, such as dioctyl phthalate, dioctyl adipate and dioctyl sebacate; and other softeners, such as microcrystalline wax, liquid polybutadiene, modified liquid polybutadiene, liquid thiokol, hydrocarbon-based synthetic lubricating oil, tall oil and rubber substitute (factice). Of these, petroleum-based softeners are preferable, and process oils, especially paraffin oils, are particularly preferable. The softeners can be used singly or as a mixture of two or more kinds.

The present inventor has thought that the combined use of (C) this softener is important in the present invention in order to realize high level of vibration damping properties, as described later.

The content of (C) the softener is 5 to 300 parts by mass, preferably 10 to 250 parts by mass, more preferably 20 to 230 parts by mass, based on 100 parts by mass of the copolymer (A).

The content ratio by mass ((C)/(D)) of (C) the softener to (D) the reinforcing filler described later is 0.3 to 1.5, preferably 0.4 to 1.4, more preferably 0.5 to 1.3. Since the content ratio ((C)/(D)) is in the above range, a crosslinked body having high hardness can be obtained from the composition.

(D) Reinforcing Filler

Specific examples of (D) the reinforcing fillers that can be used include commercially available carbon blacks, such as "Asahi #55G" and "Asahi #50HG" (trade names, manufactured by Asahi Carbon Co., Ltd.), and "SEAST (trade name)" Series: SRF, GPF, FEF, MAF, HAF, ISAF, SAF, FT and MT (manufactured by Tokai Carbon Co., Ltd.); carbon blacks obtained by surface-treating these carbon blacks with a silane-coupling agent or the like; mica, talc, silica and clay. Of these, carbon blacks "Asahi #60G", "Asahi #80" and "SEAST HAF" are preferable.

The content of (D) the reinforcing filler is 10 to 300 parts by mass, preferably 20 to 280 parts by mass, more preferably 30 to 260 parts by mass, based on 100 parts by mass of the copolymer (A).

(E) Vulcanizing Agent

As (E) the vulcanizing agent (crosslinking agent), sulfur, a sulfur-based compound, an organic peroxide, a phenolic resin, an oxime compound or the like can be used.

Examples of the sulfur-based compounds include sulfur chloride, sulfur dichloride, morpholine disulfide, alkylphenol disulfide, tetramethylthiuram disulfide and selenium dithiocarbamate. Of sulfur and the sulfur-based compounds, sulfur and tetramethylthiuram disulfide are preferable.

Examples of the organic peroxides include dicumyl peroxide, 2,5-dimethyl-2,5-di(t-butylperoxy)hexane, 2,5-dimethyl-2,5-di(benzoylperoxy)hexane, 2,5-diethyl-2,5-di(t-butylperoxy)hexyne-3, di-t-butyl peroxide, di-t-butylperoxy-3,3,5-trimethylcyclohexane and t-dibutyl hydroperoxide. Of these, dicumyl peroxide, di-t-butyl peroxide and di-t-butylperoxy-3,3,5-trimethylcyclohexane are preferable.

The content of (E) the vulcanizing agent is 0.1 to 10 parts by mass, preferably 0.3 to 9.0 parts by mass, more preferably 0.5 to 8.0 parts by mass, based on 100 parts by mass of the copolymer (A).

The composition may contain, in addition to the above components (A) to (E), a vulcanization accelerator, a vulcanization aid, a filler other than the reinforcing filler, a processing aid, an activator, a moisture absorbent, etc., within limits not detrimental to the object of the present invention.

When a sulfur-based compound is contained in the composition as the vulcanizing agent, it is preferable to use a vulcanization accelerator in combination. Examples of the vulcanization accelerators include thiazole-based vulcanization accelerators, such as N-cyclohexyl-2-benzothiazole sulfenamide, N-oxydiethylene-2-benzothiazole sulfenamide, N,N'-diisopropyl-2-benzothiazole sulfenamide, 2-mercaptobenzothiazole (e.g., "SANCELER M" (trade name, manufactured by Sanshin Chemical Industry Co., Ltd.)), 2-(4-morpholinodithio)benzothiazole (e.g., "NOCCELER MDB-P" (trade name, manufactured by Sanshin Chemical Industry Co., Ltd.)), 2-(2,4-dinitrophenyl)mercaptobenzothiazole, 2-(2,6-diethyl-4-morpholinothio)benzothiazole and dibenzothiazyl disulfide; guanidine-based vulcanization accelerators, such as diphenylguanidine, triphenylguanidine and di-ortho-tolylguanidine; aldehyde amine-based vulcanization accelerators, such as acetaldehyde-aniline condensate and butylaldehyde-aniline condensate; imidazoline-based vulcanization accelerators, such as 2-mercaptoimidazoline; thiourea-based vulcanization accelerators, such as diethylthiourea and dibutylthiourea; thiuram-based vulcanization accelerators, such as tetramethylthiuram monosulfide and tetramethylthiuram disulfide; dithionate-based vulcanization accelerators, such as zinc dimethyldithiocarbamate, zinc diethyldithiocarbamate, zinc dibutyldithiocarbamate (e.g., "SANCELER PZ" (trade name, manufactured by Sanshin Chemical Industry Co., Ltd.) and "SANCELER BZ" (trade name, manufactured by Sanshin Chemical Industry Co., Ltd.)), and tellurium diethyldithiocarbamate; thiourea-based vulcanization accelerators, such as ethylene thiourea (e.g., "SANCELER BUR" (trade name, manufactured by Sanshin Chemical Industry Co., Ltd.) and "SANCELER 22-C" (trade name, manufactured by Sanshin Chemical Industry Co., Ltd.)), and N,N'-diethylthiourea; xanthate-based vulcanization accelerators, such as zinc dibutylxanthate; and other vulcanization accelerators, such as zinc white (e.g., zinc oxide such as "META-Z102" (trade name, manufactured by Inoue Calcium Corporation)).

The content of such a vulcanization accelerator is 0.1 to 20 parts by mass, preferably 0.2 to 15 parts by mass, more preferably 0.5 to 10 parts by mass, based on 100 parts by mass of the copolymer (A).

The composition can further contain a vulcanization aid. Specific examples of the vulcanization aids include magnesium oxide and zinc white (e.g., zinc oxide such as "META-Z102" (trade name, manufactured by Inoue Calcium Corporation)). Other examples of the vulcanization aids include quinone dioxime-based vulcanization aids, such as p-quinone dioxime; acrylic vulcanization aids, such as ethylene glycol dimethacrylate and trimethylolpropane trimethacrylate; allyl-based vulcanization aids, such as diallyl phthalate and triallyl isocyanurate; maleimide-based vulcanization aids; and divinylbenzene. The vulcanization aids can be used singly or as a mixture of two or more kinds. The content of the vulcanization aid is usually 1 to 20 parts by mass based on 100 parts by mass of the copolymer (A).

As the filler other than the reinforcing filler, light calcium carbonate, heavy calcium carbonate, talc, clay or the like can be used. Of such fillers, heavy calcium carbonate is preferable. As heavy calcium carbonate, commercially available "WHITON SB" (trade name, manufactured by Shiraishi Calcium Kaisha, Ltd.) or the like can be used. The content of the filler is usually 30 to 300 parts by mass, preferably 50 to 250 parts by mass, more preferably 70 to 230 parts by mass, based on 100 parts by mass of the copolymer (A).

As the processing aids, substances that are generally compounded in rubbers as processing aids can be widely used. Specific examples thereof include ricinoleic acid, stearic acid, palmitic acid, lauric acid, barium stearate, zinc stearate, calcium stearate and esters. Of these, stearic acid is preferable. The processing aid is properly compounded usually in an amount of not more than 10 parts by mass, preferably not more than 8.0 parts by mass, more preferably not more than 5.0 parts by mass, based on 100 parts by mass of the copolymer (A).

Specific examples of the activators include amines, such as di-n-butylamine, dicyclohexylamine, monoethanolamine, "ACTING B" (trade name, manufactured by Yoshitomi Pharmaceutical Industries, Ltd.) and "ACTING SL" (trade name, manufactured by Yoshitomi Pharmaceutical Industries, Ltd.); activators, such as diethylene glycol, polyethylene glycol (e.g., "PEG#4000" (manufactured by Lion Corporation)), lecithin, triallyl trimellitate, and zinc compounds of aliphatic and aromatic carboxylic acids (e.g., "Struktol activator 73", "Struktol IB531" and "Struktol FA541" (trade names, manufactured by Schill & Seilacher GmbH)); zinc peroxide-modified activators, such as "ZEONET ZP" (trade name, manufactured by ZEON Corporation); octadecyltrimethylammonium bromide; synthetic hydrotalcites; and special quaternary ammoniumcompounds (e.g., "ARQUAD2HF" (trade name, manufactured by LION AKZO Co., Ltd.)). Of these, polyethylene glycol (e.g., "PEG#4000" (manufactured by Lion Corporation)) and "ARQUAD 2HF" are preferable. The activators can be used singly or as a mixture of two or more kinds.

The amount of the activator compounded is 0.2 to 10 parts by mass, preferably 0.3 to 5 parts by mass, more preferably 0.5 to 4 parts by mass, based on 100 parts by mass of the copolymer (A).

Specific examples of the moisture absorbents include calcium oxide, silica gel, sodium sulfate, molecular sieve, zeolite and white carbon. Of these, calcium oxide is preferable. The moisture absorbents can be used singly or as a mixture of two or more kinds. The content of the moisture absorbent is 0.5 to 15 parts by mass, preferably 1.0 to 12 parts by mass, more preferably 1.0 to 10 parts by mass, based on 100 parts by mass of the copolymer (A).

<Crosslinking Method>

The composition is obtained by kneading the components (A) to (E) and other components that are added when needed.

The crosslinked body of the present invention is obtained by crosslinking the composition. For example, the components (A) to (E) and other components are kneaded to prepare a composition, this composition is rolled into a sheet, and then, the sheet is heated at 140 to 230° C. for 2 to 30 minutes using a hot press, whereby an olefin polymer crosslinked body is obtained. The lower limit of the temperature range is preferably 150° C., more preferably 160° C., and the upper limit thereof is preferably 220° C., more preferably 200° C.

Since the non-crosslinked raw material composition is easily deformed by an external stress and cannot return to its original shape, it has poor practicality as a molding material. The crosslinked body obtained by crosslinking the composition has high practicality as a molding material. The indication of being a crosslinked body is that the tensile stress at break exceeds 5 MPa. When the tensile stress at break exceeds 5 MPa, it can be thought that there is no practical problem from the viewpoints of removal from a mold, product mounting and long-term use.

<Durometer Hardness>

The crosslinked body of the present invention has a durometer hardness (value immediately after measurement) of 50 to 80, preferably 55 to 78, more preferably 58 to 75. Since the crosslinked body of the present invention is formed from a composition having the aforesaid formulation, it has high hardness such as a durometer hardness (value immediately after measurement) of 50 to 80. The method for measuring a durometer hardness (value immediately after measurement) is described in detail in Examples. When the durometer hardness (value immediately after measurement) is not less than 50, sticking of the crosslinked body to another crosslinked body attributable to surface tackiness is reduced, so that the crosslinked body exhibits excellent handling properties, and further, the crosslinked body can be used also in high-load applications. On the other hand, if the durometer hardness (value immediately after measurement) exceeds 80, rebound resilience is increased, and the shock absorption properties tend to be lowered.

There is no specific limitation on a durometer hardness (value after 15 seconds from measurement), but it is preferable that a difference between the durometer hardness (value immediately after measurement) of the crosslinked body of the present invention and the durometer hardness (value after 15 seconds from measurement) thereof is not less than 7, because the crosslinked body exhibits excellent irregular-surface follow-up properties, can well adhere to a substrate and can fulfill its functions of vibration damping, shock absorption and vibration absorption to the maximum.

<Dynamic Viscoelasticity>

In the crosslinked body of the present invention, it is preferable that a temperature profile of tan δ obtained by measuring temperature dependence of dynamic viscoelasticity under the conditions of 1 Hz, 0.5%, −70 to 100° C. and a temperature rise rate of 4° C./min shows bimodality and peaks of the tan δ satisfy the following requirements (1) and (2), and it is more preferable that peaks of the tan δ further satisfy the following requirement (3).

(1) A peak on the low temperature side is present in the temperature range of not lower than −50° C. but lower than −10° C.

(2) A peak on the high temperature side is present in the temperature range of −10 to 40° C.

(3) [Value of tan δ at the peak present in the temperature range of −10 to 40° C.]≥[value of tan δ at the peak present in the temperature range of not lower than −50° C. but lower than −10° C.]

Since the temperature profile of the tan δ shows bimodality and peaks of the tan δ satisfy the requirements (1) and (2), higher hardness and lower rebound resilience can be realized, and since peaks of the tan δ satisfy the requirements (3) and (2), much higher hardness and much lower rebound resilience can be realized.

<Utilization of Crosslinked Body>

The crosslinked body of the present invention has high hardness and low rebound resilience. That is to say, high hardness and low rebound resilience are made compatible with each other. In particular, high hardness such as a durometer hardness of 50 to 80 and low rebound resilience such as a rebound resilience of not more than 20% are made compatible with each other.

Although the reason why such effects are exerted is not clear, the present inventor has presumed as follows. It is presumed that if the component (A) and the component (B) are only used in combination, the component (A) and the component (B) inhibit each other's functions. On the other hand, when an appropriate amount of (C) the softener coexists, (C) the softener serves to properly disperse the component (A) and the component (B), and by carrying out crosslinking in this state, the dispersed state of the components is properly maintained in the crosslinked body. That is to say, it is presumed that since such a specific dispersed state was able to be realized, the aforesaid high hardness and low rebound resilience of the crosslinked body of the present invention were able to be made compatible with each other.

On this account, from this crosslinked body of the present invention, various products having high hardness and low rebound resilience compatible with each other can be obtained. Examples of the products include a vibration damping member, a shock absorber, a vibration absorber and a resonance suppressor. The crosslinked body of the present invention can be preferably utilized in the fields where vibration damping is demanded, particularly, compatibility of high hardness and low rebound resilience with each other is demanded, such as fields of automobiles, railway vehicles, airplanes, electrical and electronic appliances, and various precision instruments.

For molding into various products, well-known molding methods, such as injection molding, various extrusion molding, compression molding, calendering and vacuum forming, can be used.

By further carrying out foaming with a well-known method using a chemical blowing agent or a physical blowing agent in the molding process, a foamed molded product can be also obtained. As the blowing agent, a well-known chemical blowing agent, or a well-known physical blowing agent, such as carbonic acid gas, nitrogen gas or water, can be used.

EXAMPLES

The present invention is further described with reference to the following examples, but it should be construed that the present invention is in no way limited to those examples. In the tables below, the numerical values of the components represent values based on parts by mass.

(Compounding Materials)

The compounding materials used in Examples and Comparative Examples are as follows.

A) Ethylene/α-olefin/non-conjugated polyene copolymer (A) having one or more peaks of tan δ in the temperature range of −50 to −30° C., the tan δ being determined by dynamic viscoelasticity measurement A-1) EPDM (trade name: Mitsui EPT 3110M (manufactured by Mitsui Chemicals, Inc.), content of structural units derived from ethylene: 56% by mass, content of structural units derived from 5-ethylidene-2-norbornene (ENB): 5.0% by mass, Mooney viscosity [ML1+4 (125° C.)]: 78, tan δ-Tg: −38° C., tan δ maximum value: 1.0)

A-2) EPDM (trade name: Mitsui EPT 9090M (manufactured by Mitsui Chemicals, Inc.), content of structural units derived from ethylene: 41% by mass, content of structural units derived from 5-ethylidene-2-norbornene (ENB): 14% by mass, Mooney viscosity [ML1+4 (125° C.)]: 58, tan δ-Tg: −32° C., tan δ maximum value: 1.8)

B) Olefin-based copolymer (B) having one or more peaks of tan δ in the temperature range of 0 to 40° C., the tan δ being determined by dynamic viscoelasticity measurement B-1) 4-methyl-1-pentene/α-olefin polymer obtained by the following Polymerization Example 1

Polymerization Example 1

Into a SUS autoclave having a volume of 1.5 liters, equipped with a stirring blade and having been thoroughly purged with nitrogen, 300 ml of normal hexane (having been dried over activated alumina in a dry nitrogen atmosphere) and 450 ml of 4-methyl-1-pentene were introduced at 23° C. Into this autoclave, 0.75 ml of a toluene solution of triisobutylaluminum (TIBAL) of 1.0 mmol/ml was introduced, and the stirrer was rotated.

Next, the autoclave was heated up to an internal temperature of 60° C. and pressurized with propylene in such a manner that the total pressure became 0.40 MPa (gauge pressure). Subsequently, 0.34 ml of a previously prepared toluene solution containing 1 mmol of methylaluminoxane in terms of Al and 0.01 mmol of diphenylmethylene(1-ethyl-3-t-butyl-cyclpentadienyl)(2,7-di-t-butyl-fluorenyl) zirconium dichloride was injected into the autoclave with nitrogen to initiate polymerization. During the polymerization reaction, temperature control was carried out in such a manner that the internal temperature of the autoclave became 60° C. After 60 minutes from the initiation of the polymerization, 5 ml of methanol was injected into the autoclave with nitrogen to terminate the polymerization, and the autoclave was depressurized to atmospheric pressure. While stirring the reaction solution, acetone was poured into the solution.

The resulting powdery polymer containing a solvent was dried at 100° C. for 12 hours under reduced pressure. The amount of the resulting polymer was 36.9 g, and in the polymer, the content of structural units derived from 4-methyl-1-pentene was 72% by mol and the content of structural units derived from propylene was 28% by mol. The polymer had a weight-average molecular weight (Mw), as measured by gel permeation chromatography (GPC), of 337,000, tan δ-Tg of 28° C. and a tan δ maximum value of 2.4.

C) Softener

C-1) paraffin oil (trade name: DIANA PROCESS OIL PS-430 (manufactured by Idemitsu Kosan Co., Ltd.))

C-2) paraffin oil (trade name: DIANA PROCESS OIL PW-90 (manufactured by Idemitsu Kosan Co., Ltd.))

D) Reinforcing Filler

D-1) carbon black (trade name: Asahi #60G (manufactured by Asahi Carbon Co., Ltd.))

D-2) carbon black (trade name: Asahi #80 (manufactured by Asahi Carbon Co., Ltd.))

E) Vulcanizing Agent

E-1) sulfur (trade name: ALPHAGRAN S-50EN (manufactured by Touchi Co., Ltd.))

E-2) dicumyl peroxide (trade name: PERCUMYL D-40 (manufactured by NOF Corporation))

F) Filler calcium carbonate (trade name: Silver-W (manufactured by Shiraishi Calcium Kaisha, Ltd.))

G) Vulcanization Aid activated zinc white (trade name: META-Z102 (manufactured by Inoue Calcium Corporation))

H) Processing Aid

H-1) stearic acid (trade name: powder stearic acid "SAKURA" (manufactured by NOF Corporation))

H-2) fatty acid ester (trade name: Struktol WB212 (manufactured by S & S Japan Co. Ltd.))

I) Activator polyethylene glycol (trade name: PEG#4000 (manufactured by Lion Corporation))

J) Vulcanization Accelerator

J-1) sulfenamide-based vulcanization accelerator: N-cyclohexyl-2-benzothiazole sulfenamide (trade name: SANCELER CM (manufactured by Sanshin Chemical Industry Co., Ltd.))

J-2) dithiocarbamate-based vulcanization accelerator: zinc dibutyldithiocarbamate (trade name: SANCELER BZ (manufactured by Sanshin Chemical Industry Co., Ltd.))

J-3) thiuram-based vulcanization accelerator: tetramethylthiuram disulfide (trade name: SANCELER TT (manufactured by Sanshin Chemical Industry Co., Ltd.))

J-4) thiuram-based vulcanization accelerator: dipentamethylenethiuram tetrasulfide (trade name: SANCELER TRA (manufactured by Sanshin Chemical Industry Co., Ltd.))

(Measuring Method and Evaluation Method)

In the following Examples and Comparative Examples, properties were measured or evaluated by the following methods.

a) Dynamic Viscoelasticity Measurement

Using a viscoelasticity measuring device "ARES" (manufactured by TA Instruments JAPAN Inc.), the temperature dependence of the viscosity of each sheet-like crosslinked body sample was measured under the following measurement conditions. The ratio (G"/G': loss tangent) of a loss elastic modulus (G") measured above to a storage elastic modulus (G') measured above was defined as "tan δ". When the tan δ was plotted against temperature, a convex curve, that is, a peak was obtained. The temperature at the apex of the peak was defined as a glass transition temperature, that is, "tan δ-Tg", and a maximum value at this temperature was determined. When two or more peaks were observed for the tan δ, the peaks were defined as a first peak and a second peak, and the tan δ-Tg value and the maximum value were recorded for both peaks.

(Measurement Conditions)

Frequency: 1.0 Hz
Temperature: −70 to 80° C.
Ramp Rate: 4.0° C./min
Strain: 0.5% b) Hardness Measurement

From a sheet-like crosslinked body sample, three crosslinked bodies were punched, then these were laminated to prepare a sample for hardness measurement, and the test was carried out. The measurement was carried out at 23° C. in accordance with the description of the test type A of "Durometer hardness test" in Clause 6 of JIS K6253 (2006) "Rubber, vulcanized or thermoplastic-Determination of hardness". A hardness given immediately after a press plate was brought into contact with the specimen and a hardness given after 15 seconds from the contact were measured. The hardness obtained immediately after the contact was defined as "durometer hardness (value immediately after measurement)", and the hardness obtained after 15 seconds from the contact was defined as "durometer hardness (value after 15 seconds from measurement)".

c) Rebound Resilience Measurement

For a columnar crosslinked body sample, measurement was carried out at 23° C. in accordance with the description of "Lupke type rebound resilience test" in Clause 4 of JIS K6255 (1996) "Rubber, vulcanized or thermoplastic-Determination of rebound resilience", to determine a rebound resilience (%). From the result, rebound resilience was evaluated in accordance with the following criteria.

A: The rebound resilience is 0 to 20%
B: The rebound resilience is 21 to 25%.
C: The rebound resilience is more than 25%.

d) Measurement of Tensile Stress at Break ($T_B$) and Tensile Elongation at Break ($E_B$)

A No. 3 dumbbell specimen described in JIS K6251 (2001) was prepared by punching it from a sheet-like crosslinked body sample.

Using this specimen, a tensile test was carried out under the conditions of a measuring temperature of 23° C. and a pulling rate of 500 mm/min in accordance with the method defined in the same JIS K6251 as above, to measure a tensile stress at break ($T_B$) and a tensile elongation at break ($E_B$).

e) Specific Gravity Measurement

A sample for specific gravity measurement was prepared by punching it from a sheet-like crosslinked body sample. The mass of this sample was measured using an automatic hydrometer (manufactured by Toyo Seiki Seisakusho, M-1 type) in an atmosphere of 25° C., and from a difference between the mass in air and the mass in pure water, a specific gravity was determined.

Example 1

Using MIXTRON BB MIXER (manufactured by Kobe Steel, Ltd., BB-4 type, volume: 2.95 L, rotor: 4WH), 100 parts by mass (430 g) of the ethylene/α-olefin/non-conjugated polyene copolymer (A-1), 50 parts by mass (215 g) of the olefin-based copolymer (B-1), 145 parts by mass (625 g) of the softener (C-1), 215 parts by mass (925 g) of the reinforcing filler (D-1), 28 parts by mass (120 g) of the filler (F), 5 parts by mass (22 g) of the vulcanization aid (G), 2 parts by mass (9 g) of the processing aid (H-1), 2 parts by mass (9 g) of the processing aid (H-2) and 1 part by mass (4 g) of the activator (I) were kneaded in a filling ratio of 70% by the use of a conventional method (total kneading time: 5 minutes). In the kneading, the rotor speed was 50 rpm, the floating weight pressure was 3 kg/cm, and the kneading discharge temperature was 138° C.

Then, after the temperature of the resulting kneadate was confirmed to have become not higher than 40° C., 1.5 parts by mass (6 g) of the vulcanization accelerator (J-1), 1.0 part by mass (4 g) of the vulcanization accelerator (J-2), 0.5 part by mass (2 g) of the vulcanization accelerator (J-3), 0.5 part by mass (2 g) of the vulcanization accelerator (J-4) and 0.8 part by mass (3.2 g) of the vulcanizing agent (E-1) were added to 2,192 g of the kneadate, and they were kneaded by the use of an 8-inch two-roll kneader. As for the kneading conditions, the roll temperatures were set at front roll/rear roll=70° C./70° C., the rotation speed of the front roll was set at 12.5 rpm, and the rotation speed of the rear roll was set at 10.4 rpm. The kneadate was rolled into a sheet, and then the sheet was heated at 160° C. for 10 minutes using a hot press and thereby vulcanized, whereby a vulcanized sheet (pressed sheet) having a thickness of 2 mm was obtained.

This vulcanized sheet was crosslinked in the following manner correspondingly to the aforesaid each measuring method, to prepare a crosslinked body sample. Property values of the crosslinked body sample were determined in accordance with the aforesaid measuring methods. The results are set forth in Table 1.

For each of the dynamic viscoelasticity measurement, the hardness measurement, the measurement of tensile stress at break ($T_B$) and tensile elongation at break ($E_B$) and the specific gravity measurement, the vulcanized sheet was crosslinked at 160° C. for 10 minutes using a 50T electric heat press manufactured by Kohtaki Corporation, whereby a sheet-like crosslinked body sample having a thickness of 2 mm was prepared.

For the rebound resilience measurement, the vulcanized sheet was crosslinked at 160° C. for 13 minutes using a 50T electric heat press manufactured by Kohtaki Corporation, whereby a columnar crosslinked body sample having a thickness of 12 mm and a diameter of 29 mm was prepared.

Examples 2 to 16

In each of Examples 2 to 9, a vulcanized sheet was prepared under the same conditions as in Example 1, except that the compounding quantities of the components A to E were changed to those shown in Table 1, and in each of Examples 10 to 16, a vulcanized sheet was prepared under the same conditions as in Example 1, except that the compounding quantities of the components A to E were changed to those shown in Table 2. Then, property values were determined in the same manner as in Example 1. In Example 16, however, the vulcanization accelerators (J-1) to (J-4) were not used, and instead of the vulcanizing agent (E-1), 8.0 parts by mass (32 g) of the vulcanizing agent (E-2) were used to prepare a vulcanized sheet. In Example 16, further, for each of the dynamic viscoelasticity measurement, the hardness measurement, the measurement of tensile stress at break ($T_B$) and tensile elongation at break ($E_3$) and the specific gravity measurement, a sheet-like crosslinked body sample having a thickness of 2 m was prepared in the same manner as in Example 1, except that the crosslinking time was changed to 20 minutes, and for the rebound resilience measurement, a columnar crosslinked body sample having a thickness of 12 mm and a diameter of 29 mm was prepared in the same manner as in Example 1, except that the crosslinking time was changed to 25 minutes. The results of Examples 2 to 9 are set forth in Table 1, and the results of Examples 10 to 16 are set forth in Table 2.

Comparative Examples 1 to 11

In each of Comparative Examples 1 to 11, a vulcanized sheet was prepared under the same conditions as in Example 1, except that the compounding quantities of the components A to E were changed to those shown in Table 3. Then, property values were determined in the same manner as in Example 1. The results of Comparative Examples 1 to 11 are set forth in Table 3.

By particularly observing the results of Comparative Example 11 and Examples, it can be seen that (C) the softener greatly contributes to making high hardness and low rebound resilience compatible with each other.

TABLE 1

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| EPDM | A-1 | 100 | 100 | 100 | 100 | 100 | 100 | — | 100 | 100 |
|  | A-2 | — | — | — | — | — | — | 100 | — | — |
| Olefin-based polymer | B-1 | 50 | 100 | 250 | 500 | 100 | 100 | 100 | 100 | 100 |
| Softener | C-1 | 125 | 125 | 125 | 125 | 145 | 165 | 125 | — | — |
|  | C-2 | — | — | — | — | — | — | — | 125 | 102 |
| Reinforcing filler | D-1 | 235 | 235 | 235 | 235 | 215 | 195 | 235 | 235 | — |
|  | D-2 | — | — | — | — | — | — | — | — | 158 |
| Vulcanizing agent | E-1 | 0.8 | 0.8 | 0.8 | 0.8 | 0.8 | 0.8 | 0.8 | 0.8 | 0.8 |
|  | E-2 | — | — | — | — | — | — | — | — | — |
|  |  | 86 | 136 | 286 | 536 | 136 | 136 | 136 | 136 | 126 |
| Dynamic viscoelasticity measurement | tanδ-Tg (° C.) | −40 | −42 | −42 | −42 | −42 | −42 | −38 | −48 | −48 |
|  | Maximum value | 0.41 | 0.31 | 0.21 | 0.12 | 0.31 | 0.36 | 0.39 | 0.32 | 0.29 |
|  | tanδ-Tg (° C.) | 16 | 14 | 16 | 20 | 14 | 14 | 12 | 0 | 4 |
|  | Maximum value | 0.46 | 0.67 | 1.01 | 1.42 | 0.51 | 0.70 | 0.73 | 0.63 | 0.62 |
| Durometer hardness | Immediately after measurement | 72 | 73 | 68 | 68 | 65 | 56 | 68 | 68 | 62 |
|  | After 15 seconds from measurement | 64 | 61 | 50 | 43 | 54 | 44 | 60 | 61 | 53 |
| Rebound resilience | Lupke type (%) | 18 | 11 | 7 | 7 | 12 | 12 | 11 | 15 | 12 |
|  | Evaluation | A | A | A | A | A | A | A | A | A |
| Tensile test | $T_B$ (MPa) | 9.2 | 8.7 | 9.6 | 11.9 | 8.3 | 6.7 | 7.0 | 8.4 | 11.8 |
|  | $E_B$ (MPa) | 210 | 230 | 360 | 455 | 340 | 475 | 150 | 260 | 460 |

TABLE 2

|  |  | Ex. 10 | Ex. 11 | Ex. 12 | Ex. 13 | Ex. 14 | Ex. 15 | Ex. 16 |
|---|---|---|---|---|---|---|---|---|
| EPDM | A-1 | 100 | 100 | 100 | 100 | 100 | 100 | 100 |
|  | A-2 | — | — | — | — | — | — | — |
| Olefin-based polymer | B-1 | 50 | 100 | 400 | 50 | 100 | 300 | 250 |
| Softener | C-1 | 102 | 102 | 102 | 56 | 56 | 56 | 125 |
|  | C-2 | — | — | — | — | — | — | — |
| Reinforcing filler | D-1 | 158 | 158 | 158 | 104 | 104 | 104 | 235 |
|  | D-2 | — | — | — | — | — | — | — |
| Vulcanizing agent | E-1 | 0.8 | 0.8 | 0.8 | 0.8 | 0.8 | 0.8 | — |
|  | E-2 | — | — | — | — | — | — | 8.0 |
|  | Compounding ratio (C)/(D) | 0.65 | 0.65 | 0.65 | 0.54 | 0.54 | 0.54 | 0.53 |
| Dynamic viscoelasticity measurement | tanδ-Tg (° C.) | −40 | −40 | −42 | −38 | −38 | −42 | −42 |
|  | Maximum value | 0.41 | 0.36 | 0.14 | 0.38 | 0.29 | 0.16 | 0.27 |
|  | tanδ-Tg (° C.) | 16 | 18 | 20 | 20 | 20 | 24 | 14 |
|  | Maximum value | 0.51 | 0.71 | 1.46 | 0.50 | 0.75 | 1.39 | 1.16 |
| Durometer hardness | Immediately after measurement | 69 | 70 | 70 | 73 | 75 | 77 | 66 |
|  | After 15 seconds from measurement | 59 | 56 | 43 | 61 | 57 | 48 | 42 |
| Rebound resilience | Lupke type (%) | 20 | 12 | 8 | 21 | 15 | 14 | 5 |
|  | Evaluation | A | A | A | B | A | A | A |

TABLE 2-continued

|  |  | Ex. 10 | Ex. 11 | Ex. 12 | Ex. 13 | Ex. 14 | Ex. 15 | Ex. 16 |
|---|---|---|---|---|---|---|---|---|
| Tensile test | $T_B$ (MPa) | 9.9 | 10.1 | 15.1 | 12.9 | 13 | 15.6 | 6.0 |
|  | $E_B$ (MPa) | 410 | 380 | 460 | 460 | 440 | 470 | 400 |
|  | Specific gravity | 1.13 | 1.09 | 0.98 | 1.11 | 1.07 | 0.98 | 1.07 |

TABLE 3

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| EPDM | A-1 | 100 | 100 | 100 | — | 100 | 100 |
|  | A-2 | — | — | — | 100 | — | — |
| Olefin-based polymer | B-1 | — | — | — | — | — | — |
| Softener | C-1 | 125 | 145 | 165 | 125 | — | 102 |
|  | C-2 | — | — | — | — | 125 | — |
| Reinforcing filler | D-1 | 235 | 215 | 195 | 235 | 235 | 158 |
|  | D-2 | — | — | — | — | — | — |
| Vulcanizing agent | E-1 | 0.8 | 0.8 | 0.8 | 0.8 | 0.8 | 0.8 |
|  | E-2 | — | — | — | — | — | — |
| Compounding ratio (C)/(D) |  | 0.53 | 0.67 | 0.85 | 0.53 | 0.53 | 0.65 |
| Dynamic viscoelasticity measurement | tanδ-Tg (° C.) | −42 | −42 | −42 | −38 | −48 | −48 |
|  | Maximum value | 0.48 | 0.57 | 0.60 | 0.73 | 0.76 | 0.40 |
|  | tanδ-Tg (° C.) | — | — | — | — | — | — |
|  | Maximum value | — | — | — | — | — | — |
| Durometer hardness | Immediately after measurement | 79 | 70 | 62 | 79 | 80 | 71 |
|  | After 15 seconds from measurement | 75 | 66 | 56 | 75 | 76 | 65 |
| Rebound resilience | Lupke type (%) | 28 | 31 | 32 | 31 | 31 | 37 |
|  | Evaluation | C | C | C | C | C | C |
| Tensile test | $T_B$ (MPa) | 10.7 | 9.4 | 9.0 | 6.3 | 10.1 | 13 |
|  | $E_B$ (MPa) | 210 | 310 | 540 | 100 | 210 | 410 |
|  | Specific gravity | 1.23 | 1.19 | 1.16 | 1.23 | 1.23 | 1.18 |

|  |  | Comp. Ex. 7 | Comp. Ex. 8 | Comp. Ex. 9 | Comp. Ex. 10 | Comp. Ex. 11 |
|---|---|---|---|---|---|---|
| EPDM | A-1 | 100 | 100 | 100 | 100 | 100 |
|  | A-2 | — | — | — | — | — |
| Olefin-based polymer | B-1 | — | — | — | 30 | 100 |
| Softener | C-1 | 102 | 56 | 13 | 56 | 4 |
|  | C-2 | — | — | — | — | — |
| Reinforcing filler | D-1 | 158 | 104 | 47 | 104 | 34 |
|  | D-2 | — | — | — | — | — |
| Vulcanizing agent | E-1 | 0.8 | 0.8 | 0.8 | 0.8 | 0.8 |
|  | E-2 | — | — | — | — | — |
| Compounding ratio (C)/(D) |  | 0.65 | 0.54 | 0.28 | 0.54 | 0.12 |
| Dynamic viscoelasticity measurement | tanδ-Tg (° C.) | −42 | −40 | −36 | −38 | −38 |
|  | Maximum value | 0.60 | 0.59 | 0.65 | 0.48 | 0.25 |
|  | tanδ-Tg (° C.) | — | — | — | 18 | 26 |
|  | Maximum value | — | — | — | 0.40 | 0.93 |
| Durometer hardness | Immediately after measurement | 70 | 71 | 71 | 72 | 85 |
|  | After 15 seconds from measurement | 65 | 67 | 68 | 63 | 63 |
| Rebound resilience | Lupke type (%) | 38 | 48 | 65 | 27 | 23 |
|  | Evaluation | C | C | C | C | C |
| Tensile test | $T_B$ (MPa) | 12 | 14.7 | 14 | 13.2 | 15.2 |
|  | $E_B$ (MPa) | 460 | 460 | 400 | 450 | 450 |
|  | Specific gravity | 1.18 | 1.17 | 1.15 | 1.15 | 1.02 |

As shown in Tables 1 to 3, the rubber crosslinked bodies shown in Examples proved to have property of relatively high hardness, such as a durometer hardness of not less than 50, and low impact resilience that were compatible with each other, as compared with the rubber crosslinked bodies shown in Comparative Examples. In Comparative Examples 1 to 9, an olefin-based copolymer having a peak of tan δ within the range of 0 to 40° C. was not contained, and therefore, a target value of a rebound resilience of not more than 20% was not reached. In Comparative Example 10, the olefin-based copolymer (B) having a peak of tan δ within the range of 0 to 40° C. was contained, but the compounding quantity of the olefin-based copolymer (B) was not more than 50 parts by mass based on 100 parts by mass of the copolymer (A), and therefore, the above-described target value of the rebound resilience was not reached. Since the rubber crosslinked bodies shown in Examples were each composed of EPDM that was a non-conjugated diene rubber, and an olefin-based polymer, weathering resistance and moist heat resistance can be expected. In addition, they were excellent also in tensile stress at break ($T_B$) and tensile elongation at break ($E_B$) determined in the tensile test, and they exhibit lightweight properties such as a specific gravity of not more than 1.18.

The crosslinked body of the present invention has such characteristics as above, and therefore, in a field of mobility-related products, such as automobiles, railway vehicles and airplanes, a field of sporting goods, such as shoes and tennis rackets, a field of equipment with a vibration, such as processing machines, rock drills and impact wrenches, and other fields, industrial applicability to vibration absorbers, shock absorbers and vibration dampers directed to holding grips and the like is expected.

The invention claimed is:

1. A composition comprising
100 parts by mass of (A) an ethylene/α-olefin/non-conjugated polyene copolymer having one or more peaks of tan δ in the temperature range of −50 to −30° C., the tan δ being determined by dynamic viscoelasticity measurement, by using a viscoelasticity measuring device under measurement conditions where the frequency is 0 Hz, the temperature is −70 to 80° C., and the ramp rate is 4.0° C./min and strain is 0.5%,
50 to 500 parts by mass of (B) an olefin-based copolymer having one or more peaks of tan δ in the temperature range of 0 to 40° C., the tan δ being determined by dynamic viscoelasticity measurement, by using a viscoelasticity measuring device under measurement conditions where the frequency is 0 Hz, the temperature is −70 to 80° C., and the ramp rate is 4.0° C./min and strain is 0.5%,
5 to 300 parts by mass of (C) a softener,
10 to 300 parts by mass of (D) a reinforcing filler, and
0.1 to 10 parts by mass of (E) a vulcanizing agent,
the composition having a content ratio by mass ((C)/(D)) of (C) the softener to (D) the reinforcing filler of 0.3 to 1.5.

2. A crosslinked body obtained by crosslinking a composition comprising
100 parts by mass of (A) an ethylene/α-olefin/non-conjugated polyene copolymer having one or more peaks of tan δ in the temperature range of −50 to −30° C., the tan δ being determined by dynamic viscoelasticity measurement, by using a viscoelasticity measuring device under measurement conditions where the frequency is 0 Hz, the temperature is −70 to 80° C., and the ramp rate is 4.0° C./min and strain is 0.5%,
50 to 500 parts by mass of (B) an olefin-based copolymer having one or more peaks of tan δ in the temperature range of 0 to 40° C., the tan δ being determined by dynamic viscoelasticity measurement, by using a viscoelasticity measuring device under measurement conditions where the frequency is 0 Hz, the temperature is −70 to 80° C., and the ramp rate is 4.0° C./min and strain is 0.5%,
5 to 300 parts by mass of (C) a softener,
10 to 300 parts by mass of (D) a reinforcing filler, and
0.1 to 10 parts by mass of (E) a vulcanizing agent,
the composition having a content ratio by mass ((C)/(D)) of (C) the softener to (D) the reinforcing filler of 0.3 to 1.5,
the crosslinked body having a durometer hardness (value immediately after measurement) of 50 to 80.

3. The crosslinked body according to claim 2, wherein a temperature profile of tan δ obtained by measuring temperature dependence of dynamic viscoelasticity under the conditions of 1 Hz, 0.5%, −70 to 100° C. and a temperature rise rate of 4° C./min shows bimodality, and peaks of the tan δ satisfy the following requirements:
(1) a peak on the low temperature side is present in the temperature range of not lower than −50° C. but lower than −10° C., and
(2) a peak on the high temperature side is present in the temperature range of −10 to 40° C.

4. The crosslinked body according to claim 3, wherein peaks of the tan δ further satisfy the following requirement (3):
(3) [value of tan δ at the peak present in the temperature range of −10 to 40° C.]≥[value of tan δ at the peak present in the temperature range of not lower than −50° C. but lower than −10° C.].

5. The crosslinked body according to claim 2, wherein (B) the olefin-based copolymer comprises
(B1) a 4-methyl-1-pentene/α-olefin copolymer having a content ratio of structural units (i) of 16 to 95% by mol, the structural units (i) being derived from 4-methyl-1-pentene, a content ratio of structural units (ii) of 5 to 84% by mol, the structural units (ii) being derived from at least one α-olefin selected from α-olefins having 2 to 20 carbon atoms (except 4-methyl-1-pentene), and a content ratio of structural units (iii) of 0 to 10% by mol, the structural units (iii) being derived from a non-conjugated polyene, (with the proviso that the total of the structural units (i), (ii) and (iii) is 100% by mol).

6. The crosslinked body according to claim 2, wherein (D) the reinforcing filler is at least one kind selected from carbon black, mica, talc, silica and clay.

7. The crosslinked body according to claim 2, wherein (C) the softener is paraffin oil.

8. A vibration damping member made of the crosslinked body according to claim 2.

9. A shock absorber made of the crosslinked body according to claim 2.

10. A vibration absorber made of the crosslinked body according to claim 2.

11. A resonance suppressor made of the crosslinked body according to claim 2.

12. A production process for an olefin polymer crosslinked body, comprising the steps of:
introducing into solution 100 parts by mass of (A) an ethylene/α-olefin/non-conjugated polyene copolymer having one or more peaks of tan δ in the temperature range of −50 to −30° C., the tan δ being determined by dynamic viscoelasticity measurement, by using a viscoelasticity measuring device under measurement conditions where the frequency is 0 Hz, the temperature is −70 to 80° C., and the ramp rate is 4.0° C./min and strain is 0.5%,
50 to 500 parts by mass of (B) an olefin-based copolymer having one or more peaks of tan δ in the temperature range of 0 to 40° C., the tan δ being determined by dynamic viscoelasticity measurement, by using a viscoelasticity measuring device under measurement conditions where the frequency is 0 Hz, the temperature is −70 to 80° C., and the ramp rate is 4.0° C./min and strain is 0.5%,
5 to 300 parts by mass of (C) a softener,
10 to 300 parts by mass of (D) a reinforcing filler, and
0.1 to 10 parts by mass of (E) a vulcanizing agent,
reacting under the conditions of 140 to 230° C., and,
whereby the composition has a compounding ratio by mass ((C)/(D)) of (C) the softener to (D) the reinforcing filler of 0.3 to 1.5.

13. The composition according to claim 1, comprising 56 to 300 parts by mass of (C) a softener.

14. The crosslinked body according to claim 2, comprising 56 to 300 parts by mass of (C) a softener.

15. The production process for an olefin polymer crosslinked body according to claim 12, the composition comprising 56 to 300 parts by mass of (C) a softener.

16. The composition according to claim 1, comprising 100 to 500 parts by mass of (B) an olefin-based copolymer and 102 to 300 parts by mass of (C) a softener.

17. The crosslinked body according to claim 2, comprising 100 to 500 parts by mass of (B) an olefin-based copolymer and 102 to 300 parts by mass of (C) a softener.

18. The production process for an olefin polymer crosslinked body according to claim 12, the composition comprising 100 to 500 parts by mass of (B) an olefin-based copolymer and 102 to 300 parts by mass of (C) a softener.

* * * * *